US010625201B2

(12) United States Patent
Liskey et al.

(10) Patent No.: US 10,625,201 B2
(45) Date of Patent: Apr. 21, 2020

(54) DUAL LAYER-COATED MEMBRANES FOR GAS SEPARATIONS

(71) Applicant: UOP LLC, Des Plaines, IL (US)

(72) Inventors: Carl Liskey, Chicago, IL (US); Chunqing Liu, Arlington Heights, IL (US); Michael Hamoy, Crystal Lake, IL (US); Nicole Karns, Chicago, IL (US); Howie Tran, Skokie, IL (US); David W. Greer, Cary, IL (US)

( * ) Notice: Subject to any disclaimer, the term of this patent is extended or adjusted under 35 U.S.C. 154(b) by 221 days.

(21) Appl. No.: 15/796,703

(22) Filed: Oct. 27, 2017

(65) Prior Publication Data

US 2018/0043298 A1 Feb. 15, 2018

Related U.S. Application Data

(63) Continuation of application No. PCT/US2016/056713, filed on Oct. 13, 2016.

(60) Provisional application No. 62/245,002, filed on Oct. 22, 2015.

(51) Int. Cl.
  *B01D 53/22* (2006.01)
  *B01D 71/32* (2006.01)
  *B01D 69/10* (2006.01)
  *B01D 69/12* (2006.01)
  *B01D 67/00* (2006.01)

(52) U.S. Cl.
  CPC .......... *B01D 53/228* (2013.01); *B01D 53/22* (2013.01); *B01D 67/0088* (2013.01); *B01D 69/10* (2013.01); *B01D 69/12* (2013.01); *B01D 71/32* (2013.01); *B01D 2256/10* (2013.01); *B01D 2256/18* (2013.01); *B01D 2256/24* (2013.01); *B01D 2257/108* (2013.01); *B01D 2257/504* (2013.01); *Y02C 10/10* (2013.01)

(58) Field of Classification Search
  CPC .. B01D 53/22; B01D 53/228; B01D 67/0088; B01D 69/10; B01D 69/12; B01D 71/32; B01D 2257/108; B01D 2257/504
  See application file for complete search history.

(56) References Cited

U.S. PATENT DOCUMENTS

| 3,133,132 | A | 5/1964 | Sidney et al. |
| 4,230,463 | A | 10/1980 | Henis et al. |
| 4,855,048 | A | 8/1989 | Tang et al. |
| 4,877,528 | A | 10/1989 | Friesen et al. |
| 5,104,729 | A * | 4/1992 | Stedronsky ........ B01D 67/0088 427/243 |
| 6,368,382 | B1 | 4/2002 | Chiou |
| 6,932,589 | B2 | 8/2005 | Suzuki |
| 7,048,846 | B2 | 5/2006 | White et al. |
| 8,038,885 | B2 | 10/2011 | Schmidt et al. |
| 8,222,166 | B2 | 7/2012 | Chu et al. |
| 8,772,041 | B2 | 7/2014 | Schmidt et al. |
| 2009/0277837 | A1* | 11/2009 | Liu ........................ B01D 69/12 210/650 |
| 2014/0260986 | A1* | 9/2014 | Ishizuka .............. B01D 53/228 96/13 |
| 2014/0352540 | A1* | 12/2014 | Okada .................. B01D 53/228 96/12 |
| 2016/0008766 | A1* | 1/2016 | Aburaya ................ B01D 69/12 422/222 |

FOREIGN PATENT DOCUMENTS

| EP | 0056512 A1 * | 7/1982 | ............. B01D 13/04 |
| EP | 0799087 B1 | 5/2002 | |
| GB | 1324019 A | 7/1973 | |
| JP | 58092421 A | 6/1983 | |
| JP | 2014208846 A | 11/2014 | |
| WO | 8500985 A1 | 3/1985 | |

OTHER PUBLICATIONS

Riley, "Thin-Film Composite Membrane for Single-Stage Seawater Desalination by Reverse Osmosis", Applied Polymer Symposium No. 22, 255-267 (1973).
Search Report dated Jan. 26, 2017 for corresponding PCT Appl. No. PCT/US16/56713.

* cited by examiner

*Primary Examiner* — Jason M Greene

(57) ABSTRACT

The invention discloses dual layer-coated membranes and methods for making and using these membranes. The dual layer-coated membranes have a relatively porous and substantial void-containing selective asymmetric membrane support, a first coating layer comprising a hydrogel, and a second coating layer comprising a hydrophobic fluoropolymer. The membrane support has low selectivity and high permeance. The dual layer coating improves the selectivity of the membrane support and maintains the membrane performance with time. The dual layer-coated membranes are suitable for a variety of liquid, gas, and vapor separations such as water purification, non-aqueous liquid separation such as deep desulfurization of gasoline and diesel fuels, ethanol/water separations, pervaporation dehydration of aqueous/organic mixtures, fuel gas conditioning, $CO_2/CH_4$, $He/CH_4$, $CO_2/N_2$, $H_2/CH_4$, $O_2/N_2$, olefin/paraffin, iso/normal paraffins separations, and other light gas mixture separations. The dual layer-coated membranes are especially useful for natural gas liquid (NGL) recovery and $CO_2$ removal from natural gas.

18 Claims, No Drawings

DUAL LAYER-COATED MEMBRANES FOR GAS SEPARATIONS

CROSS-REFERENCE TO RELATED APPLICATIONS

This application is a Continuation of International Application No. PCT/US2016/056713 filed Oct. 13, 2016 which application claims benefit of U.S. Provisional Application No. 62/245,002 filed Oct. 22, 2015, the contents of which cited applications are hereby incorporated by reference in their entirety.

BACKGROUND OF THE INVENTION

Membrane-based technologies have advantages of both low capital cost and high-energy efficiency compared to conventional separation methods. Polymeric membranes have proven to operate successfully in industrial gas separations such as in the separation of nitrogen from air and the separation of carbon dioxide from natural gas. Cellulose acetate (CA) commercial spiral wound and hollow fiber membranes have been used extensively for natural gas upgrading. However, CA membranes still need improvement in a number of properties including selectivity, performance durability, chemical stability, resistance to hydrocarbon contaminants, resistance to solvent swelling, and resistance to $CO_2$ plasticization. Natural gas often contains substantial amounts of heavy hydrocarbons and water, either as an entrained liquid, or in vapor form, which may lead to condensation within membrane modules. The gas separation capabilities of CA membranes are affected by contact with liquids including water and aromatic hydrocarbons such as benzene, toluene, ethylbenzene, and xylene (BTEX). The presence of more than modest levels of liquid BTEX heavy hydrocarbons is potentially damaging to the CA membrane. Therefore, precautions must be taken to remove the entrained liquid water and heavy hydrocarbons upstream of the membrane separation steps using expensive membrane pretreatment system. Another issue of CA polymer membranes that still needs to be addressed for their use in gas separations in the presence of high concentration of condensable gas or vapor such as carbon dioxide ($CO_2$) and propylene is the plasticization of the polymer by these condensable gases or vapors that leads to swelling of the membrane as well as a significant increase in the permeance of all components in the feed and a decrease in the selectivity of CA membranes. For example, the permeation behavior of $CO_2$ in CA membranes is different when compared to some other glassy polymers in that above a certain pressure level, the permeability coefficient begins to increase with pressure due to the onset of plasticization by the $CO_2$. A high concentration of sorbed $CO_2$ leads to increased segmental motion, and, consequently, the transport rate of the penetrant is enhanced. The challenge of treating gas, such as natural gas, that contains relatively large amounts of $CO_2$, such as more than about 50%, is particularly difficult.

In addition, some natural gas feed has high $CO_2$/C2+ concentration (usually $CO_2$>70%). Membranes can be used to recover the high value natural gas liquid while removing $CO_2$ from natural gas. Membranes can separate $CO_2$ from $CH_4$ and C2+ and recover C2+ from the membrane retentate. When using membranes for this separation, the feed side temperature drops significantly due to $CO_2$ permeation (J-T effect), and the feed gas dew point increases as $CO_2$ permeates, therefore liquid comes out from membrane system. The membranes, however, show significantly decreased membrane permeance in the presence of liquid aliphatic hydrocarbons, liquid aromatics, or both liquid aliphatic hydrocarbons and liquid aromatics.

Therefore, new robust membranes with stable performance under repetitive short term exposure to liquid hydrocarbon condensation, high resistance to hydrocarbon contaminants, high resistance to solvent swelling, and high resistance to $CO_2$ plasticization desired for natural gas upgrading.

Polymeric membrane materials have been found to be of use in gas separations. Numerous research articles and patents describe polymeric membrane materials (e.g., polyimides, polysulfones, polycarbonates, polyethers, polyamides, polyarylates, polypyrrolones) with desirable gas separation properties, particularly for use in oxygen/nitrogen separation (see, for example, U.S. Pat. No. 6,932,589). The polymeric membrane materials are typically used in processes in which a feed gas mixture contacts the upstream side of the membrane, resulting in a permeate mixture on the downstream side of the membrane with a greater mole fraction of one of the components than the composition of the original feed gas mixture. A pressure differential is maintained between the upstream and downstream sides, providing the driving force for permeation. The downstream side can be maintained as a vacuum, or at any pressure below the upstream pressure.

The membrane performance is characterized by the flux of a gas component across the membrane. This flux can be expressed as a quantity called the permeability (P), which is a pressure- and thickness-normalized flux of a given component. The separation of a gas mixture is achieved by a membrane material that permits a faster permeation rate for one component (i.e., higher permeability) over that of another component. The efficiency of the membrane in enriching a component over another component in the permeate stream can be expressed as a quantity called selectivity. Selectivity can be defined as the ratio of the permeabilities of the gas components across the membrane (i.e., $P_A/P_B$, where A and B are the two components). A membrane's permeability and selectivity are material properties of the membrane material itself, and thus these properties are ideally constant with feed pressure, flow rate and other process conditions. However, permeability and selectivity are both temperature-dependent. It is desired to develop membrane materials with a high selectivity (efficiency) for the desired component, while maintaining a high permeability (productivity) for the desired component.

The relative ability of a membrane to achieve the desired separation is referred to as the separation factor or selectivity for the given mixture. There are however several other obstacles to use a particular polymer to achieve a particular separation under any sort of large scale or commercial conditions. One such obstacle is permeation rate or flux. One of the components to be separated must have a sufficiently high permeation rate at the preferred conditions or extraordinarily large membrane surface areas are required to allow separation of large amounts of material. Therefore, commercially available polymer membranes, such as CA, polyimide, and polysulfone membranes formed by phase inversion and solvent exchange methods have an asymmetric integrally skinned membrane structure. See U.S. Pat. No. 3,133,132. Such membranes are characterized by a thin, dense, selectively semipermeable surface "skin" and a less dense void-containing (or porous), non-selective support region, with pore sizes ranging from large in the support region to very small proximate to the "skin". Such membranes have a serious shortcoming in that, in operation, the permeation rate and/or selectivity is reduced to unacceptable levels over time. This can occur for several reasons. One reason for the decrease of permeation rate has been attributed to a collapse of some of the pores near the skinned surface of the membrane, resulting in an undue densification of the surface skin. One attempt at overcoming this problem has been the development of thin film composite (or TFC) membranes, comprising a thin selective skin deposited on a resilient porous support. See, for example, "Thin-Film Composite Membrane for Single-Stage Seawater Desalination by Reverse Osmosis" by R. L. Riley et al., Applied Polymer Symposium No. 22, pages 255-267 (1973). TFC membranes can be formed from CA, polysulfone, polyethersulfone, polyamide, polyimide, polyetherimide, cellulose nitrate, polyurethane, polycarbonate, polystyrene, etc. While TFC membranes are less susceptible to flux decline than phase inversion-type membranes, fabrication of TFC membranes that are free from leaks is difficult, and fabrication requires multiple steps and so is generally more complex and costly. Another reason for the reduced permeation rate and/or selectivity over time is that impurities present in the mixture can over time clog the pores, if present, or interstitial spaces in the polymer. Yet another reason is that one or more components of the mixture can alter the form or structure of the polymer membrane over time thus changing its permeation rate and/or selectivity. One specific way this can happen is if one or more components of the mixture cause plasticization of the polymer membrane. Plasticization occurs when one or more of the components of the mixture act as a solvent in the polymer often causing it to swell and lose its membrane properties. It has been found that polymers such as cellulose acetate and polyimides which have particularly good separation factors for separation of mixtures comprising carbon dioxide and methane are prone to plasticization over time thus resulting in decreasing performance of these membranes.

One approach to overcoming the problem of leaks in asymmetric integrally skinned membranes has been the fabrication of an asymmetric integrally skinned gas separation membrane comprising a relatively porous and substantial void-containing selective "parent" membrane such as polysulfone or cellulose acetate that would have selectivity were it not porous, wherein the parent membrane is coated with a material such as a fluoropolymer, polysiloxane, a silicone rubber, or a UV-curable epoxysilicone in occluding contact with the porous parent membrane, the coating filling surface pores and other imperfections comprising voids (see US 20090277837 A1, U.S. Pat. Nos. 4,230,463; 4,877,528; 6,368,382). U.S. Pat. No. 4,230,463 provides one of the first examples for using a silicone rubber coating material to improve the selectivity of a polysulfone gas separation membrane. The coating of such coated membranes comprising siloxane or silicone segments, however, is subject to swelling by solvents, poor performance durability, low resistance to hydrocarbon contaminants, and low resistance to plasticization by the sorbed penetrant molecules such as $CO_2$ or $C_3H_6$. On the other hand, delamination occurs easily for the coating layer of hydrophobic fluoropolymers directly on the relatively porous and substantial void-containing selective "parent" polymer membrane in the presence of liquid aromatic hydrocarbon contaminants such as BTEX in the gas feed.

Therefore, an asymmetric membrane post-treatment is needed which improves selectivity, resistance to liquid hydrocarbon contaminants, high resistance to solvent swelling, and high resistance to plasticization, but does not change or damage the membrane, or cause the membrane to lose performance with time. In addition, gas separation membranes desirably have a high permeation rate to gases. This means that the effective portion of the membrane should be as thin as possible. Therefore, the coating layer on the top surface of the relatively porous and substantial void-containing selective "parent" asymmetric membrane needs to be thin and the materials used as the coating layer should not significantly reduce the membrane permeance or flux.

The present invention discloses a new dual layer-coated asymmetric membrane for gas separations wherein the membrane has a relatively porous and substantial void-containing selective asymmetric membrane support, a first layer comprising a hydrogel coating and a second layer comprising a hydrophobic fluoropolymer coating. The relatively porous and substantial void-containing selective asymmetric membrane support can be made from any polymeric material such as polysulfone, polyethersulfone, polyimide, polyetherimide, cellulose acetate, cellulose triacetate, and mixtures thereof, and the hydrogel coating can be formed from a water-soluble polymeric species capable of forming a hydrogel such as gelatin and sodium alginate. The new dual layer-coated asymmetric membranes have advantages of low cost, high permeance (or flux), as well as stable permeance (or flux) and sustained selectivity over time by resistance to solvent swelling, plasticization and liquid hydrocarbon contaminants for gas separation applications.

SUMMARY OF THE INVENTION

This invention pertains to a new dual layer-coated asymmetric membrane comprising a relatively porous and substantial void-containing selective asymmetric membrane support, a first coating layer comprising a hydrogel and a second coating layer comprising a hydrophobic fluoropolymer as well as methods for making and using these membranes.

The relatively porous and substantial void-containing selective asymmetric membrane support of the dual layer-coated asymmetric membrane described in the present invention normally has low selectivity and high flux and can be made from any polymeric material including polysulfone, polyethersulfone, polyimide, polyetherimide, cellulose acetate, cellulose triacetate, cellulose nitrate, polyurethane, polycarbonate, polybenzoxazole, and mixtures thereof. The hydrogel coating on the relatively porous and substantial void-containing selective asymmetric membrane support can be formed from a water-soluble polymeric species capable of forming a hydrogel such as gelatin and sodium alginate. The hydrophobic fluoropolymer coating on top of the hydrogel coating on the relatively porous and substantial void-containing selective asymmetric membrane support can be formed from an organic solvent-soluble hydrophobic fluoropolymer with high gas permeability.

The present invention also discloses a method of making the dual layer-coated asymmetric membrane without delamination of the hydrophobic fluoropolymer coating layer. The method involves the use of a rough micro/nano structured surface of the hydrogel coating on the relatively porous and substantial void-containing selective asymmetric membrane support to improve the adhesion of the coating layer of the hydrophobic fluoropolymer on the membrane. The coating of a layer of hydrogel on the relatively porous and substantial void-containing selective asymmetric membrane support results in the formation of a rough membrane surface in micro/nano scale that is critical to prevent the delamination of the hydrophobic fluoropolymer coating layer from the membrane. The rough micro/nano structured surface described in the current invention means an uneven rough membrane surface covered with spherical, needle-like, or other types of tiny bumps of less than about 10 micrometers in height.

The dual layer-coated asymmetric membranes have the advantages of low cost, high permeance (or flux), as well as stable permeance (or flux) and sustained selectivity over time by resistance to solvent swelling, plasticization and liquid hydrocarbon contaminants for gas separation applications. The dual layer coating improves the selectivity of the porous asymmetric membrane support and exhibits essentially no loss in selectivity or no loss in flux rates over a typical operating period. The term "essentially no loss in flux rates" means that the flux declines less than about 30%, and more particularly the flux rate declines less than 20% over a typical operating period of about 3 years.

The present invention also discloses a process of using the dual layer-coated asymmetric membrane for gas separations such as natural gas liquid (NGL) recovery and CO2 removal from natural gas in one-step, fuel gas conditioning, hydrogen recovery, natural gas upgrading applications such as off-shore gas-processing platforms, floating liquefied natural gas (FLNG), and floating, processing, storage and offloading (FPSO) vessel applications. The invention provides a process for separating at least one gas from a mixture of gases using the dual layer-coated asymmetric membrane, the process comprising: (a) providing a dual layer-coated asymmetric membrane which is permeable to the at least one gas; (b) contacting the mixture on one side of the dual layer-coated asymmetric membrane to cause the at least one gas to permeate the new dual layer-coated asymmetric membrane; and (c) removing from the opposite side of the membrane a permeate gas composition comprising a portion of the at least one gas which permeated the membrane.

The dual layer-coated asymmetric membrane of the present invention are suitable for a variety of liquid, gas, and vapor separations such as desalination of water by reverse osmosis, non-aqueous liquid separation such as deep desulfurization of gasoline and diesel fuels, ethanol/water separations, pervaporation dehydration of aqueous/organic mixtures, $CO_2/CH_4$, $CO_2/N_2$, $H_2/CH_4$, $O_2/N_2$, olefin/paraffin, iso/normal paraffins separations, fuel gas conditioning, and other light gas mixture separations.

DETAILED DESCRIPTION OF THE INVENTION

The use of membranes for separation of both gases and liquids is a growing technological area with potentially high economic reward due to the low energy requirements and the potential for scaling up of modular membrane designs. Advances in membrane technology, with the continuing development of new membrane materials will make this technology even more competitive with traditional, high-energy intensive and costly processes such as distillation. Among the applications for large scale gas separation membrane systems are nitrogen enrichment, oxygen enrichment, hydrogen recovery, removal of hydrogen sulfide and carbon dioxide from natural gas and dehydration of air and natural gas. Also, various hydrocarbon separations are potential applications for the appropriate membrane system. The materials that are used in these applications must have high selectivity, durability, and productivity in processing large volumes of gas or liquid in order to be economically successful. Membranes for gas separations have evolved rapidly in the past 25 years due to their easy processability for scale-up and low energy requirements. More than 90% of the membrane gas separation applications involve the separation of noncondensable gases such as carbon dioxide from methane, nitrogen from air, and hydrogen from nitrogen, argon or methane. Membrane gas separation is of special interest to petroleum producers and refiners, chemical companies, and industrial gas suppliers. Several applications of membrane gas separation have achieved commercial success, including carbon dioxide removal from natural gas and biogas and in enhanced oil recovery.

The membranes most commonly used in commercial gas separation applications are asymmetric polymeric membranes characterized by a thin, dense, selectively semipermeable surface "skin" and a less dense porous, void-containing, non-selective support region. Gas separation by these membranes is based on a solution-diffusion mechanism. This mechanism involves molecular-scale interactions of the permeating gas with the membrane polymer. This mechanism assumes that each component is sorbed by the membrane at one interface, transported by diffusion across the membrane through the voids between the polymeric chains (or called free volume), and desorbed at the other interface. According to the solution-diffusion model, the membrane performance for a given pair of gases (e.g., $CO_2/CH_4$, $O_2/N_2$, $H_2/CH_4$) is determined by two parameters: permeability coefficient ($P_A$) and the selectivity ($\alpha_{A/B}$). The $P_A$ is the product of the gas flux and the membrane "skin" thickness, divided by the pressure difference across the membrane. The $\alpha_{A/B}$ is the ratio of the permeability coefficients of the two gases ($\alpha_{A/B}=P_A/P_B$) where $P_A$ is the permeability of the more permeable gas and $P_B$ is the permeability of the less permeable gas. Gases can have high permeability coefficient because of a high solubility coefficient, a high diffusion coefficient, or both. The diffusion coefficient decreases and the solubility coefficient increases with the increase in the molecular size of the gas. For high-performance polymer membranes, both high permeability and selectivity are desirable because higher permeability decreases the size of the membrane area required to treat a given amount of gas, thereby decreasing the capital cost of membrane units, and because higher selectivity results in a higher purity product gas with increased efficiency. However, some of the high-performance polymeric gas separation membrane materials still have the issues of high cost, poor hydrocarbon contaminant resistance, poor plasticization resistance, low chemical and thermal stability, unstable permeance (or flux) and selectivity over time, and poor processability to form a defect-free thin selective skin layer.

U.S. Pat. No. 6,368,382 by Chiou claimed a method of making an epoxysilicone coated membrane by coating a porous asymmetric membrane layer with a UV-curable controlled release epoxysilicone coating. A mixture of the epoxysilicone resin and an onium photocatalyst are applied to the porous asymmetric membrane layer and cured by UV or electron beam radiation to produce a dry epoxysilicone coated membrane. The coating of such coated membranes comprising siloxane or silicone segments, however, is subject to swelling by solvents, poor performance durability, low resistance to hydrocarbon contaminants, and low resistance to plasticization by the sorbed penetrant molecules such as CO2 or C3H6.

US 20090277837 A1 by Liu et al. provided a fluoropolymer coated membrane where the porous asymmetric membrane layer was coated directly by a thin layer of a hydrophobic fluoropolymer to improve the selectivity of the gas separation membrane. The coating of such coated membranes comprising hydrophobic fluoropolymer segments, however, is subject to delamination by liquid hydrocarbon contaminants in the natural gas feed such as BTEX for natural gas upgrading. Delamination will result in poor performance durability, reduced resistance to hydrocarbon contaminants and plasticization.

This invention relates to a dual layer-coated asymmetric membrane comprising a relatively porous and substantial void-containing selective asymmetric membrane support, a first coating layer comprising a hydrogel and a second coating layer comprising a hydrophobic fluoropolymer. In addition, this invention relates to a method for making the dual layer-coated asymmetric membrane as well as the application of these membranes not only for a variety of gas separations such as separations of $CO_2/CH_4$, $He/CH_4$, olefin/paraffin separations (e.g. propylene/propane separation), fuel gas conditioning, $H_2/CH_4$, $O_2/N_2$, iso/normal paraffins, polar molecules such as $H_2O$, $H_2S$, and NH3/ mixtures with $CH_4$, $N_2$, $H_2$, and other light gases separations, but also for NGL recovery and $CO_2$ removal from natural gas in a single step.

The dual layer-coated asymmetric membrane described in the current invention comprises a relatively porous and substantial void-containing selective asymmetric membrane support which is first coated with a hydrogel such as gelatin and then coated with a thin layer of a hydrophobic fluoropolymer. The dual layer coating provides improved selectivity for the relatively porous and substantial void-containing selective asymmetric membrane support. The dual layer coating also provides essentially no loss in selectivity or no loss in flux rates over a typical operating period in the presence of high concentrations of $CO_2$ and/or in the presence of liquid hydrocarbon contaminants such as BTEX (benzene, toluene, ethylbenzene, and xylenes). The term "essentially no loss in flux rates" means that the flux declines less than about 30%, and more particularly the flux rate declines less than 20% over a typical operating period of about 3 years.

The relatively porous and substantial void-containing selective asymmetric membrane support with a low selectivity and high flux described in the current invention can be formed by phase inversion followed by direct air drying or it can also be formed by phase inversion followed by solvent exchange methods (see U.S. Pat. No. 3,133,132). Selection of the relatively porous and substantial void-containing selective asymmetric membrane support may be made on the basis of the heat resistance, solvent resistance, and mechanical strength of the porous asymmetric membrane layer, as well as other factors dictated by the operating conditions for selective permeation. The hydrogel coating, fluoropolymer coating, and the relatively porous and substantial void-containing selective asymmetric membrane support need to have the prerequisite relative separation factors in accordance with the invention for at least one pair of gases or liquids. The relatively porous and substantial void-containing selective asymmetric membrane support is preferably at least partially self-supporting, and in some instances may be essentially self-supporting. The relatively porous and substantial void-containing selective asymmetric membrane support may provide essentially all of the structural support for the membrane, or the double coated membrane may include a structural support member which can provide little, if any, resistance to the passage of gases or liquids.

Generally, the relatively porous and substantial void-containing selective asymmetric membrane support is prepared from cellulosic polymers such as cellulose acetate and cellulose triacetate, other polymers such as polysulfone, polyethersulfone, polyimide, polyetherimide, and polybenzoxazole. These polymers provide a range of properties such as low cost, high permeance, good mechanical stability, and ease of processability that are important for gas and liquid separations. Typical polymers that are used can be substituted or unsubstituted polymers and may be selected from but is not limited to, polysulfones; sulfonated polysulfones; polyethersulfones; sulfonated PESs; polyethers; polyetherimides; polycarbonates; cellulosic polymers such as cellulose acetate, cellulose triacetate, cellulose acetate-butyrate, cellulose propionate, ethyl cellulose, methyl cellulose, nitrocellulose; polyamides; polyimides; polyamide/imides; polyketones, polyether ketones; poly(arylene oxides) such as poly(phenylene oxide) and poly(xylene oxide); polyurethanes; poly(benzobenzimidazole)s; polybenzoxazoles; polymers of intrinsic microporosity; and mixtures of thereof.

Some preferred polymers that are suitable for the preparation of the relatively porous and substantial void-containing selective asymmetric membrane support include, but are not limited to polyetherimides, cellulosic polymers such as cellulose acetate and cellulose triacetate, polyamides, polyimides, and mixtures thereof.

The solvents used for dissolving the polymer material for the preparation of the relatively porous and substantial void-containing selective asymmetric membrane support are chosen primarily for their ability to completely dissolve the polymers and for ease of solvent removal in the membrane formation steps. Other considerations in the selection of solvents include low toxicity, low corrosive activity, low environmental hazard potential, availability and cost. Representative solvents include most amide solvents that are typically used for the formation of the relatively porous and substantial void-containing selective asymmetric membrane support, such as N-methylpyrrolidone (NMP) and N,N-dimethyl acetamide (DMAc), methylene chloride, tetrahydrofuran (THF), acetone, methyl acetate, isopropanol, n-octane, n-hexane, n-decane, methanol, ethanol, N,N-dimethylformamide (DMF), dimethyl sulfoxide (DMSO), lactic acid, citric acid, dioxanes, 1,3-dioxolane, mixtures thereof, others known to those skilled in the art and mixtures thereof.

The hydrogel coating on the relatively porous and substantial void-containing selective asymmetric membrane support of the new dual layer-coated asymmetric membrane described in the present invention can be formed from a water-soluble polymeric species capable of forming a hydrogel such as gelatin and sodium alginate. Gelatin is a heterogeneous mixture of water-soluble proteins. The proteins are extracted by boiling skin, tendons, ligaments, bones, etc. in water. There are two types of gelatins, type A and type B. Type A gelatin is derived from acid-cured tissue and Type B gelatin is derived from lime-cured tissue. Gelatin has a combination of high molecular weight, which is typically advantageous for a membrane coating material, and the ability to readily form a hydrogel, even without a metal species being present.

The layer of hydrophobic fluoropolymer coating on top of the layer of hydrogel coating on the relatively porous and substantial void-containing selective asymmetric membrane support of the new dual layer-coated asymmetric membrane can be formed from an organic solvent-soluble hydrophobic fluoropolymer with high gas permeability. The fluoropolymers have high thermal, chemical, mechanical and electrical stability, as well as high gas permeability. The fluoropolymer may be an amorphous fluoropolymer selected from the DuPont™ Teflon® AF family of amorphous fluoropolymers including Teflon® AF1600 and Teflon® AF2400, FluoroPel™ PFC 504A CoE5 and FluoroPel™ PFC 504A CoFS fluoropolymers from Cytonix Corporation. Teflon AF fluoropolymers include a fluoropolymer that is a homopolymer of 2,2-bistrifluoro-methyl-4,5-difluoro-1,3-dioxole (PDD), and a fluoropolymer that is an amorphous copolymer of 2,2-bistrifluoro-methyl-4,5-difluoro-1,3-dioxole (PDD) with a complementary amount of another fluorine-containing monomer selected from the group consisting of tetrafluoroethylene (TFE), perfluoro(alkyl vinyl ether)s, hexafluoropropylene, vinylidene fluoride, and chlorotrifluoroethylene. Other fluoropolymers include a fluoropolymer that is an amorphous copolymer of 2,2-bistrifluoro-methyl-4,5-difluoro-1,3-dioxole (PDD) and tetrafluoroethylene (TFE), a fluoropolymer that is an amorphous copolymer of 2,2-bistrifluoro-methyl-4,5-difluoro-1,3-dioxole (PDD) and tetrafluoroethylene (TFE) with 65 mol-% of dioxole and a glass transition temperature of 160° C. (DuPont Teflon® AF1600) and a fluoropolymer that is an amorphous copolymer of 2,2-bistrifluoro-methyl-4,5-difluoro-1,3-dioxole (PDD) and tetrafluoroethylene (TFE) with 87 mol-% of dioxole and a glass transition temperature of 240° C. (DuPont Teflon® AF2400). Another type of fluoropolymers used in the present invention is Hyflon AD fluoropolymers from Solvay Solexis including a fluoropolymer that is a copolymer of 2,2,4-trifluoro-5-trifluoromethoxy-1,3-dioxole (TTD) and tetrafluoroethylene (TFE) and a fluoropolymer that is a copolymer of 2,2,4-trifluoro-5-trifluoromethoxy-1, 3-dioxole (TTD) and tetrafluoroethylene (TFE) with 80 mol-% of TTD and 20 mol-% of TFE. Fluoropolymers from Cytonix Corporation that can also be used in the present invention include a fluoropolymer that is a fluoro-silane fluorinated copolymer with silane functional groups and a fluoropolymer that is a fluoro-epoxide fluorinated oligomer with epoxide functional groups.

The organic solvents that can be used for dissolving the fluoropolymer in the present invention are essentially perfluorinated solvents and mixtures thereof such as Fluorinert FC-75 (perfluoro(n-butyltetrahydrofuran)), Fluorinert FC-72, Fluorinert FC-770, and Fluorinert FC-40 (perfluoro (alkyl amine)). It is preferred that the fluoropolymer be diluted in the perfluorinated organic solvent or mixtures thereof in a concentration of from about 0.01 to about 10 wt-% to provide an effective coating.

The new dual layer-coated asymmetric membrane can be either a flat sheet membrane or a hollow fiber membrane.

The present invention also provides a method of making the dual layer-coated asymmetric membrane without delamination of the hydrophobic fluoropolymer coating layer from the membrane. The method involves the use of a rough micro/nano structured surface of a first coating layer comprising a hydrogel coating on the relatively porous and substantial void-containing selective asymmetric membrane support to improve the adhesion of a second coating layer comprising a hydrophobic fluoropolymer on the membrane. The coating of the hydrogel on the relatively porous and substantial void-containing selective asymmetric membrane support results in the formation of a rough membrane surface in micro/nano scale that is critical to improve the adhesion between the membrane and the hydrophobic fluoropolymer coating and prevents delamination of the hydrophobic fluoropolymer coating layer from the membrane. The rough micro/nano structured surface described in the current invention means an uneven rough membrane surface covered with spherical, needle-like, or other types of tiny bumps of less than about 10 micrometers in height.

The method to form the relatively porous and substantial void-containing selective asymmetric membrane support either in a flat sheet form or a hollow fiber form comprises casting or spinning a membrane casting or spinning dope to form a wet relatively porous and substantial void-containing selective asymmetric membrane, and then drying the relatively porous and substantial void-containing selective asymmetric membrane through a direct air drying method (see U.S. Pat. No. 4,855,048) or through a solvent exchange method (see U.S. Pat. No. 3,133,132) to form a dried relatively porous and substantial void-containing selective asymmetric flat sheet membrane support or asymmetric hollow fiber membrane support. The membrane casting or spinning dope comprises a polymer dissolved in a mixture of organic solvents or two or more blend polymers dissolved in a mixture of organic solvents. For example, the relatively porous and substantial void-containing selective asymmetric membrane support can be a thin relatively porous and substantial void-containing asymmetric cellulosic membrane support having a skin thickness of less than about 10,000 angstroms. Preferably, the thin relatively porous and substantial void-containing asymmetric cellulosic membrane support has a skin thickness between about 200 and about 1000 angstroms, and more preferably, the thin relatively porous and substantial void-containing asymmetric cellulosic membrane support has a skin thickness between about 300 and about 500 angstroms. The membrane performance of the relatively porous and substantial void-containing selective asymmetric membrane support for a given pair of gases (e.g., $CO_2/CH_4$, $O_2/N_2$, $H_2/CH_4$) is determined by two parameters: permeability coefficient (or called permeability, $P_A$) and the selectivity ($\alpha_{A/B}$). Generally, in order to separate one gaseous component from another, the ratio of the permeability of the more permeable component to the other component, which is the selectivity of the more permeable component over the other component should be at least five. The term "relatively porous and substantial void-containing selective asymmetric cellulosic membrane support" in the context of the current invention includes cellulose ester membranes such as cellulose acetate, cellulose diacetate, cellulose triacetate, cellulose propionate, cellulose butyrate, cellulose cyanoethylate, cellulose methacrylate, and mixtures thereof. A particularly preferred relatively porous and substantial void-containing selective asymmetric cellulosic membrane support comprises cellulose acetate or/and cellulose triacetate. The relatively porous and substantial void-containing selective asymmetric cellulosic membrane support can be made to any degree of initial porosity as characterized by its initial selectivity, which may range from 1.1 to about 8. The relatively porous and substantial void-containing selective asymmetric cellulosic membrane support of the present invention is porous and is characterized as having an initial selectivity of higher than 1.1 and less than about 8, and more preferably having a selectivity of higher than 2 and less than about 5.

An aqueous hydrogel-forming polymer solution such as an aqueous gelatin solution is applied to the relatively porous and substantial void-containing selective asymmetric membrane support by nipping, dip-coating, spin coating, casting, soaking, spraying, painting, and other known conventional solution coating technologies. The resulting hydrogel coating such as gelatin coating on the surface of the relatively porous and substantial void-containing selective asymmetric membrane support provides a membrane with an uneven rough membrane surface covered with spherical, needle-like, or other types of tiny bumps of less than about 10 micrometer in height.

The concentration of the hydrogel-forming polymer in the aqueous hydrogel-forming polymer solution is dependent upon the initial porosity of the relatively porous and substantial void-containing selective asymmetric membrane support.

A thin hydrophobic fluoropolymer coating layer is formed on the top surface of the hydrogel coating layer on the relatively porous and substantial void-containing selective asymmetric membrane support by applying a dilute fluoropolymer solution to the top surface of the hydrogel coating layer on the relatively porous and substantial void-containing selective asymmetric membrane support by nipping, dip-coating, spin coating, casting, soaking, spraying, painting, and other known conventional solution coating technologies. The second thin hydrophobic fluoropolymer coating layer is formed after evaporating the perfluorinated organic solvent(s).

The concentration of the fluoropolymer in the fluoropolymer coating solution is dependent upon the initial porosity of the relatively porous and substantial void-containing selective asymmetric membrane support and the performance of the hydrogel-coated asymmetric membrane.

The combination of the rough micro/nano structured surface created from the hydrogel coating with the low surface energy created from the hydrophobic fluoropolymer coating provided the new dual layer-coated asymmetric membranes described in the present invention with high resistance to delamination and liquid contaminants. The new dual layer-coated asymmetric membranes have the advantages of low cost, high permeance (or flux), as well as stable permeance (or flux) and sustained selectivity over time by resistance to solvent swelling, plasticization and liquid hydrocarbon contaminants for gas separation applications. The dual layer coating improves the selectivity of the relatively porous and substantial void-containing selective asymmetric membrane support and exhibits essentially no loss in selectivity or no loss in flux rates over a typical operating period. The term "essentially no loss in flux rates" means that the flux declines less than about 30%, and more particularly the flux rate often declines less than 20% over a typical operating period.

The invention provides a process for separating at least one gas from a mixture of gases using the dual layer-coated membranes described in the present invention, the process comprising: (a) providing a dual layer-coated membrane which is permeable to the at least one gas; (b) contacting the mixture on one side of the dual layer-coated membrane to cause the at least one gas to permeate the dual layer-coated membranes; and (c) removing from the opposite side of the membrane a permeate gas composition comprising a portion of the at least one gas which permeated said membrane.

The dual layer-coated membranes of the present invention are especially useful in the purification, separation or adsorption of a particular species in the liquid or gas phase. In addition to separation of pairs of gases, these dual layer-coated membranes may, for example, be used for natural gas liquid (NGL) recovery and $CO_2$ removal from natural gas in one-step, fuel gas conditioning to separate methane from C2 and C2+ hydrocarbons, as well as natural gas upgrading applications such as FLNG and FPSO applications. The dual layer-coated membranes may also be used for the purification of water or for the separation of proteins or other thermally unstable compounds, e.g. in the pharmaceutical and biotechnology industries. The dual layer-coated membranes may also be used in fermenters and bioreactors to transport gases into the reaction vessel and transfer cell culture medium out of the vessel. Additionally, the dual layer-coated membranes may be used for the removal of microorganisms from air or water streams, water purification, ethanol production in a continuous fermentation/membrane pervaporation system, and in detection or removal of trace compounds or metal salts in air or water streams.

The dual layer-coated membranes of the present invention are especially useful in gas separation processes in air purification, petrochemical, refinery, and natural gas industries. Examples of such separations include separation of volatile organic compounds (such as toluene, xylene, and acetone) from an atmospheric gas, such as nitrogen or oxygen and nitrogen recovery from air. Further examples of such separations are for the separation of $CO_2$ from natural gas, $H_2$ from $N_2$, $CH_4$, and Ar in ammonia purge gas streams, $H_2$ recovery in refineries, fuel gas conditioning, olefin/paraffin separations such as propylene/propane separation, and iso/normal paraffin separations. Any given pair or group of gases that differ in molecular size, for example nitrogen and oxygen, carbon dioxide and methane, hydrogen and methane or carbon monoxide, helium and methane, can be separated using the dual layer-coated membranes described herein. More than two gases can be removed from a third gas. For example, some of the gas components which can be selectively removed from a raw natural gas using the membrane described herein include carbon dioxide, oxygen, nitrogen, water vapor, hydrogen sulfide, helium, and other trace gases. Some of the gas components that can be selectively retained include hydrocarbon gases. When permeable components are acid components selected from the group consisting of carbon dioxide, hydrogen sulfide, and mixtures thereof and are removed from a hydrocarbon mixture such as natural gas, one module, or at least two in parallel service, or a series of modules may be utilized to remove the acid components. For example, when one module is utilized, the pressure of the feed gas may vary from 275 kPa to about 2.6 MPa (25 to 4000 psi). The differential pressure across the membrane can be as low as about 0.7 bar or as high as 145 bar (about 10 psi or as high as about 2100 psi) depending on many factors such as the particular membrane used, the flow rate of the inlet stream and the availability of a compressor to compress the permeate stream if such compression is desired. Differential pressure greater than about 145 bar (2100 psi) may rupture the membrane. A differential pressure of at least 7 bar (100 psi) is preferred since lower differential pressures may require more modules, more time and compression of intermediate product streams. The operating temperature of the process may vary depending upon the temperature of the feed stream and upon ambient temperature conditions. Preferably, the effective operating temperature of the dual layer-coated membranes of the present invention will range from about −50° to about 100° C. More preferably, the effective operating temperature of the dual layer-coated membranes of the present invention will range from about −20° to about 70° C., and most preferably, the effective operating temperature of the dual layer-coated membranes of the present invention will be less than about 70° C.

The dual layer-coated membranes described in the current invention are also especially useful in gas/vapor separation processes in chemical, petrochemical, pharmaceutical and allied industries for removing organic vapor or liquid from gas streams, e.g. in off-gas treatment for recovery of volatile organic compounds to meet clean air regulations, or within process streams in production plants so that valuable compounds (e.g., vinylchloride monomer, propylene) may be recovered. Further examples of gas/vapor separation processes in which these dual layer-coated membranes may be used are hydrocarbon vapor separation from hydrogen in oil and gas refineries, for hydrocarbon dew pointing of natural gas (i.e. to decrease the hydrocarbon dew point to below the lowest possible export pipeline temperature so that liquid hydrocarbons do not separate in the pipeline), for control of methane number in fuel gas for gas engines and gas turbines, and for gasoline recovery. The dual layer-coated membranes may incorporate a species that adsorbs strongly to certain gases (e.g. cobalt porphyrins or phthalocyanines for $O_2$ or silver(I) for ethane) to facilitate their transport across the membrane.

These dual layer-coated membranes may also be used in the separation of liquid mixtures by pervaporation, such as in the removal of organic compounds (e.g., alcohols, phenols, chlorinated hydrocarbons, pyridines, ketones) from water such as aqueous effluents or process fluids. A dual layer-coated membrane which is ethanol-selective would be used to increase the ethanol concentration in relatively dilute ethanol solutions (5-10% ethanol) obtained by fermentation processes. Another liquid phase separation example using these dual layer-coated membranes is the deep desulfurization of gasoline and diesel fuels by a pervaporation membrane process similar to the process described in U.S. Pat. No. 7,048,846, incorporated by reference herein in its entirety. The dual layer-coated membranes that are selective to sulfur-containing molecules would be used to selectively remove sulfur-containing molecules from fluid catalytic cracking (FCC) and other naphtha hydrocarbon streams. Further liquid phase examples include the separation of one organic component from another organic component, e.g. to separate isomers of organic compounds. Mixtures of organic compounds which may be separated using the dual layer-coated membranes include: ethylacetate-ethanol, diethylether-ethanol, acetic acid-ethanol, benzene-ethanol, chloroform-ethanol, chloroform-methanol, acetone-isopropylether, allylalcohol-allylether, allylalcohol-cyclohexane, butanol-butylacetate, butanol-1-butylether, ethanol-ethylbutylether, propylacetate-propanol, isopropylether-isopropanol, methanol-ethanol-isopropanol, and ethylacetate-ethanol-acetic acid.

The dual layer-coated membranes may be used for separation of organic molecules from water (e.g. ethanol and/or phenol from water by pervaporation) and removal of metal and other organic compounds from water.

An additional application of the dual layer-coated membranes is in chemical reactors to enhance the yield of equilibrium-limited reactions by selective removal of a specific product in an analogous fashion to the use of dual layer-coated membranes to enhance esterification yield by the removal of water.

The dual layer-coated membranes have immediate applications for the separation of gas mixtures including carbon dioxide removal from natural gas. The dual layer-coated membranes permit carbon dioxide to diffuse through at a faster rate than the methane in the natural gas. Carbon dioxide has a higher permeation rate than methane because of higher solubility, higher diffusivity, or both. Thus, carbon dioxide enriches on the permeate side of the membrane, and methane enriches on the feed (or reject) side of the membrane.

Any given pair of gases that differ in size, for example, nitrogen and oxygen, carbon dioxide and methane, carbon dioxide and nitrogen, hydrogen and methane or carbon monoxide, helium and methane, can be separated using the dual layer-coated membranes described herein. More than two gases can be removed from a third gas. For example, some of the components which can be selectively removed from a raw natural gas using the dual layer-coated membranes described herein include carbon dioxide, oxygen, nitrogen, water vapor, hydrogen sulfide, helium, and other trace gases. Some of the components that can be selectively retained include hydrocarbon gases.

EXAMPLES

The following examples are provided to illustrate one or more preferred embodiments of the invention, but are not limited embodiments thereof. Numerous variations can be made to the following examples that lie within the scope of the invention.

Example 1

Preparation of High Flux Gelatin-Coated and then AF2400-Coated Asymmetric Cellulose Acetate-Cellulose Triacetate Membrane (Abbreviated as "HF-AF-Gelatin/CA-CTA")

A relatively porous and substantial void-containing selective asymmetric cellulose acetate-cellulose triacetate membrane support having a $CO_2/CH_4$ selectivity of about 1.5-2 and $CO_2$ permeance of about 400 GPU (50° C., 1000 psig, 10% $CO_2$/90% $CH_4$) was prepared in a conventional manner from a casting dope comprising, by approximate weight percentages, 8.2% cellulose triacetate, 8.2% cellulose acetate, 18.4% N-methyl pyrrolidone, 26.4% 1,3-dioxolane, 12.3% acetone, and 26.5% of non-solvents. A film was cast on a nylon fabric then gelled by immersion in a 1° C. water bath for about 10 minutes, and then annealed in a hot water bath at 80° to 90° C. for about 15 minutes to form a relatively porous and substantial void-containing selective asymmetric cellulose acetate-cellulose triacetate wet membrane. An aqueous solution of gelatin coating material was dripped onto the surface of the relatively porous and substantial void-containing selective asymmetric cellulose acetate-cellulose triacetate wet membrane to form a gelatin-coated asymmetric cellulose acetate-cellulose triacetate wet membrane. The gelatin-coated asymmetric cellulose acetate-cellulose triacetate wet membrane was dried with a continuous drying machine at 70° C. at 2.0 fpm. The dried gelatin-coated asymmetric cellulose acetate-cellulose triacetate membrane was dip coated with a AF2400 polymer solution in Fluorinert FC-770 solvent and dried at 85° C. to form the dried high flux gelatin-coated and then AF2400-coated asymmetric cellulose acetate-cellulose triacetate membrane (abbreviated as "HF-AF-Gelatin/CA-CTA").

Example 2

Preparation of High Selectivity Gelatin-Coated and then AF2400-Coated Asymmetric Cellulose Acetate-Cellulose Triacetate Membrane (Abbreviated as "HS-AF-Gelatin/CA-CTA")

A relatively porous and substantial void-containing selective asymmetric cellulose acetate-cellulose triacetate membrane support having a $CO_2/CH_4$ selectivity of about 3-4 and $CO_2$ permeance of about 290-350 GPU (50° C., 1000 psig, 10% $CO_2$/90% $CH_4$) was prepared in a conventional manner from a casting dope comprising, by approximate weight percentages, 8.2% cellulose triacetate, 8.2% cellulose acetate, 12.3% N-methyl pyrrolidone, 34.8% 1,3-dioxolane, 10.2% acetone, and 26.3% of non-solvents. A film was cast on a nylon fabric then gelled by immersion in a 1° C. water bath for about 10 minutes, and then annealed in a hot water bath at 80° to 90° C. for about 15 minutes to form a relatively porous and substantial void-containing selective asymmetric cellulose acetate-cellulose triacetate wet membrane. An aqueous solution of gelatin coating material was dripped onto the surface of the relatively porous and substantial void-containing selective asymmetric cellulose acetate-cellulose triacetate wet membrane to form a gelatin-coated asymmetric cellulose acetate-cellulose triacetate wet membrane. The gelatin-coated asymmetric cellulose acetate-cellulose triacetate wet membrane was dried with a continuous drying machine at 70° C. at 2.0 fpm. The dried gelatin-coated asymmetric cellulose acetate-cellulose triacetate membrane was dip coated with a AF2400 polymer solution in Fluorinert FC-770 solvent and dried at 85° C. to form the dried high selectivity gelatin-coated and then AF2400-coated asymmetric cellulose acetate-cellulose triacetate membrane (abbreviated as "HS-AF-Gelatin/CA-CTA").

Comparative Example 2

Preparation of Gelatin-Coated Asymmetric Cellulose Acetate-Cellulose Triacetate Membrane (Abbreviated as "Gelatin/CA-CTA")

A relatively porous and substantial void-containing selective asymmetric cellulose acetate-cellulose triacetate membrane support having a $CO_2/CH_4$ selectivity of about 3-4 and $CO_2$ permeance of about 290-350 GPU (50° C., 1000 psig, 10% $CO_2$/90% $CH_4$) was prepared in a conventional manner from a casting dope comprising, by approximate weight percentages, 8.2% cellulose triacetate, 8.2% cellulose acetate, 12.3% N-methyl pyrrolidone, 34.8% 1,3-dioxolane, 10.2% acetone, and 26.3% of non-solvents. A film was cast on a nylon fabric then gelled by immersion in a 1° C. water bath for about 10 minutes, and then annealed in a hot water bath at 80° to 90° C. for about 15 minutes to form a relatively porous and substantial void-containing selective asymmetric cellulose acetate-cellulose triacetate wet membrane. An aqueous solution of gelatin coating material was dripped onto the surface of the relatively porous and substantial void-containing selective asymmetric cellulose acetate-cellulose triacetate wet membrane to form a gelatin-coated asymmetric cellulose acetate-cellulose triacetate wet membrane. The gelatin-coated asymmetric cellulose acetate-cellulose triacetate wet membrane was dried with a continuous drying machine at 70° C. at 2.0 fpm to form the dried gelatin-coated asymmetric cellulose acetate-cellulose triacetate membrane (abbreviated as "Gelatin/CA-CTA").

Example 3

$CO_2/CH_4$ Separation Performance of HF-AF-Gelatin/CA-CTA and HS-AF-Gelatin/CA-CTA Membranes A 76 mm (3 inch) diameter circle of HF-AF-Gelatin/CA-CTA membrane of Example 1 and a 76 mm (3 inch) diameter circle of HS-AF-Gelatin/CA-CTA of Example 2 were evaluated for gas transport properties using a natural gas feed containing 10% $CO_2$ and 90% $CH_4$ at a feed pressure of 6996 kPa (1000 psig) at 50° C. Table 1 shows a comparison of $CO_2$ permeance ($P_{CO2}/L$) and $CO_2/CH_4$ selectivity ($\alpha_{CO2/CH4}$) of the HF-AF-Gelatin/CA-CTA and HS-AF-Gelatin/CA-CTA membranes of the present invention. The results in Table 1 show that the high selectivity HS-AF-Gelatin/CA-CTA membrane showed higher $CO_2/CH_4$ selectivity and lower $CO_2$ permeance than the high flux HF-AF-Gelatin/CA-CTA membrane.

TABLE 1

| | | |
|---|---|---|
| $CO_2/CH_4$ separation performance of HF-AF-Gelatin/CA-CTA and HS-AF-Gelatin/CA-CTA membranes [a] | | |
| Membrane | $P_{CO2}/L$ (GPU) [b] | $\alpha_{CO2/CH4}$ |
| HF-AF-Gelatin/CA-CTA | 262 | 12.6 |
| HS-AF-Gelatin/CA-CTA | 190 | 15.1 |

[a] Tested at 50° C. under 6996 kPa (1000 psig), 10% $CO_2$/90% $CH_4$ mixed gas pressure.
[b] 1 GPU = 2.7 × 10$^{-5}$ m$^3$ (STP)/m$^2$ · h · kPa.

Example 4

$CO_2/CH_4$ Separation Performance of HF-AF-Gelatin/CA-CTA Membrane with High $CO_2$ Concentration Feed Gas A 76 mm (3 inch) diameter circle of HF-AF-Gelatin/CA-CTA membrane of Example 1 was evaluated for gas transport properties for 22 h of continuous testing using a natural gas feed containing high $CO_2$ concentration of 50% $CO_2$ and 50% $CH_4$ at a feed pressure of 3549 kPa (500 psig) at 50° C. Table 2 shows $P_{CO2}/L$ and $\alpha_{CO2/CH4}$ of the HF-AF-Gelatin/CA-CTA membrane of the present invention after 1 h, 2 h, 4 h, and 6 h of permeation. It can be seen from Table 2 that the HF-AF-Gelatin/CA-CTA membrane has $P_{CO2}/L$ of 336 GPU and $\alpha_{CO2/CH4}$ of 16.0 after 1 h of permeation in the presence of 50% $CO_2$/50% $CH_4$ feed under 500 psig feed pressure. The membrane showed no drop in $CO_2$ permeance and $CO_2/CH_4$ selectivity after 6 h of permeation in the presence of 50% $CO_2$/50% $CH_4$ feed under 500 psig feed pressure.

TABLE 2

| | | |
|---|---|---|
| $CO_2/CH_4$ separation performance of HF-AF-Gelatin/CA-CTA membrane in the presence of high $CO_2$ concentration natural gas feed [a] | | |
| HF-AF-Gelatin/ CA-CTA Membrane | $P_{CO2}/L$ (GPU) [b] | $\alpha_{CO2/CH4}$ |
| 1 h performance | 335.3 | 16.0 |
| 2 h performance | 334.9 | 16.1 |
| 4 h performance | 335.9 | 16.1 |
| 6 h performance | 335.9 | 16.1 |

[a] Tested at 50° C. under 3549 kPa (500 psig), 50% $CO_2$/50% $CH_4$ mixed gas pressure.
[b] 1 GPU = 2.7 × 10$^{-5}$ m$^3$ (STP)/m$^2$ · h · kPa.

Example 5

$CO_2/CH_4$ Separation Performance of HS-AF-Gelatin/CA-CTA Membrane after Exposure to Liquid Toluene A 76 mm (3 inch) diameter circle of HS-AF-Gelatin/CA-CTA membrane of Example 2 and a 76 mm (3 inch) diameter circle of Gelatin/CA-CTA membrane of Comparative Example 2 were evaluated for $CO_2/CH_4$ separation properties using a natural gas feed containing 10% $CO_2$ and 90% $CH_4$ at a feed pressure of 6996 kPa (1000 psig) at 50° C.

before and after the membrane coating layer surface was soaked with liquid toluene for 10 min. Experimental results in Table 3 demonstrated that the HS-AF-Gelatin/CA-CTA membrane showed 2.6% decrease in $CO_2$ permeance and 5.3% drop in $CO_2/CH_4$ selectivity after the membrane coating layer surface was soaked in liquid toluene for 10 min. However, the Gelatin/CA-CTA membrane without fluoropolymer coating showed 51.6% drop in $CO_2$ permeance after the membrane coating layer surface was soaked in liquid toluene for 10 min. The hydrophobic fluoropolymer coating of the HS-AF-Gelatin/CA-CTA membrane of Example 2 significantly reduced the wetting and membrane structure collapsing of the gelatin coated CA-CTA membrane underneath the fluoropolymer coating layer in the presence of liquid toluene. Therefore, the HS-AF-Gelatin/CA-CTA membrane of Example 2 with a hydrophobic fluoropolymer coating did not show significant $CO_2$ permeance drop compared to the gelatin-coated CA-CTA membrane without fluoropolymer coating. These results demonstrated that the gelatin and then fluoropolymer double-coated CA-CTA membrane has high resistance to hydrocarbons and can be used for high hydrocarbon resistant applications and natural gas condensing service.

TABLE 3

$CO_2/CH_4$ separation performance of HS-AF-Gelatin/CA-CTA membrane before and after exposure to liquid toluene [a]

| Membrane | $P_{CO_2}/L$ (GPU) [b] | $\alpha_{CO2/CH4}$ |
|---|---|---|
| HS-AF-Gelatin/CA-CTA before exposure to liquid toluene | 189.9 | 15.1 |
| HS-AF-Gelatin/CA-CTA after exposure to liquid toluene | 185.0 | 14.3 |
| Gelatin/CA-CTA before exposure to liquid toluene | 252.1 | 10.3 |
| Gelatin/CA-CTA after exposure to liquid toluene | 122.0 | 14.8 |

[a] Tested at 50° C. under 6996 kPa (1000 psig), 10% $CO_2$/90% $CH_4$ mixed gas pressure.
[b] 1 GPU = $2.7 \times 10^{-5}$ $m^3$ (STP)/$m^2$ ·h·kPa.

Example 6

Preparation of High Flux Gelatin-Coated and then AF1600-Coated Asymmetric Cellulose Acetate-Cellulose Triacetate Membrane (Abbreviated as "HF-AF1600-Gelatin/CA-CTA-1-2")

A relatively porous and substantial void-containing selective asymmetric cellulose acetate-cellulose triacetate membrane support having a $CO_2/CH_4$ selectivity of about 1.4 and $CO_2$ permeance of about 800 GPU (50° C., 250 psig, 10% $CO_2$/90% $CH_4$) was prepared in a conventional manner from a casting dope comprising, by approximate weight percentages, 14.4% cellulose triacetate, 5.1% cellulose acetate, 18.7% N-methyl pyrrolidone, 27.0% 1,3-dioxolane, 12.4% acetone, and 26.5% of non-solvents. A film was cast on a nylon fabric then gelled by immersion in a 1° C. water bath for about 10 minutes, and then annealed in a hot water bath at 80° to 90° C. for about 15 minutes to form a relatively porous and substantial void-containing selective asymmetric cellulose acetate-cellulose triacetate wet membrane. An aqueous solution of gelatin coating material was dripped onto the surface of the relatively porous and substantial void-containing selective asymmetric cellulose acetate-cellulose triacetate wet membrane to form a gelatin-coated asymmetric cellulose acetate-cellulose triacetate wet membrane. The gelatin-coated asymmetric cellulose acetate-cellulose triacetate wet membrane was dried with a continuous drying machine at 70° C. at 2.0 fpm. The dried gelatin-coated asymmetric cellulose acetate-cellulose triacetate membrane was dip coated with a AF1600 polymer solution in Fluorinert FC-770 solvent and dried at 85° C. to form the dried high flux gelatin-coated and then AF1600-coated asymmetric cellulose acetate-cellulose triacetate membrane (abbreviated as "HF-AF1600-Gelatin/CA-CTA-1-2").

Example 7

Preparation of High Flux Chitosan-Coated and then AF1600-Coated Asymmetric Cellulose Acetate-Cellulose Triacetate Membrane (Abbreviated as "HF-AF1600-Chitosan/CA-CTA-1-2")

A relatively porous and substantial void-containing selective asymmetric cellulose acetate-cellulose triacetate membrane support having a $CO_2/CH_4$ selectivity of about 1.4 and $CO_2$ permeance of about 800 GPU (50° C., 250 psig, 10% $CO_2$/90% $CH_4$) was prepared in a conventional manner from a casting dope comprising, by approximate weight percentages, 14.4% cellulose triacetate, 5.1% cellulose acetate, 18.7% N-methyl pyrrolidone, 27.0% 1,3-dioxolane, 12.4% acetone, and 26.5% of non-solvents. A film was cast on a nylon fabric then gelled by immersion in a 1° C. water bath for about 10 minutes, and then annealed in a hot water bath at 80° to 90° C. for about 15 minutes to form a relatively porous and substantial void-containing selective asymmetric cellulose acetate-cellulose triacetate wet membrane. An aqueous acetic acid solution of chitosan coating material was dripped onto the surface of the relatively porous and substantial void-containing selective asymmetric cellulose acetate-cellulose triacetate wet membrane to form a chitosan-coated asymmetric cellulose acetate-cellulose triacetate wet membrane. The chitosan-coated asymmetric cellulose acetate-cellulose triacetate wet membrane was dried with a continuous drying machine at 70° C. at 2.0 fpm. The dried chitosan-coated asymmetric cellulose acetate-cellulose triacetate membrane was dip coated with a AF1600 polymer solution in Fluorinert FC-770 solvent and dried at 85° C. to form the dried high flux chitosan-coated and then AF1600-coated asymmetric cellulose acetate-cellulose triacetate membrane (abbreviated as "HF-AF1600-Chitosan/CA-CTA-1-2").

Example 8

HF-AF1600-Gelatin/CA-CTA-1-2 and HF-AF1600-Chitosan/CA-CTA-1-2 Membranes for Fuel Gas Conditioning Application A 49.5 mm diameter circle of HF-AF1600-Gelatin/CA-CTA-1-2 membrane of Example 6 and a 49.5 mm diameter circle of HF-AF1600-Chitosan/CA-CTA-1-2 of Example 7 were evaluated for fuel gas conditioning application using a fuel gas feed containing 5% $CO_2$, 70% $CH_4$, 15% $C_2H_6$, and 10% $C_3H_8$ at a feed pressure of 3549 kPa (500 psig) at 50° C. The results in Table 4 show that both HF-AF1600-Gelatin/CA-CTA-1-2 membrane and HF-AF1600-Chitosan/CA-CTA-1-2 membrane permeate methane ($CH_4$) faster than ethane ($C_2H_6$) and propane ($C_3H_8$) and have high $CH_4$ permeability, good $CH_4/C_2H_6$ selectivity and high $CH_4/C_3H_8$ selectivity to produce high $CH_4$ content fuel gas and C2+ enriched tail gas.

TABLE 4

HF-AF1600-Gelatin/CA-CTA-1-2 and
HF-AF1600-Chitosan/CA-CTA-1-2 membranes
for fuel gas conditioning application [a]

| Membrane | $P_{CH4}/L$ (GPU) [b] | $\alpha_{CH4}/C2H6$ | $\alpha_{CH4}/C3H8$ |
|---|---|---|---|
| HF-AF1600-Gelatin/CA-CTA-1-2 | 22.9 | 3.20 | 20.1 |
| HF-AF1600-Chitosan/CA-CTA-1-2 | 24.6 | 3.03 | 16.6 |

[a] Tested at 50° C. under 3549 kPa (500 psig) feed pressure with a fuel gas feed containing 5% $CO_2$, 70% $CH_4$, 15% $C_2H_6$, and 10% $C_3H_8$.
[b] 1 GPU = 2.7 × $10^{-5}$ $m^3$ (STP)/$m^2$ ·h · kPa.

The invention claimed is:

1. A membrane comprising a relatively porous and substantial void-containing selective asymmetric membrane support comprising a high performance glassy polymer and two coating layers, a first coating layer comprising a hydrogel on the top surface of said membrane support and a second coating layer comprising a fluoropolymer on top of said first coating layer, wherein said hydrogel is selected from the group consisting of gelatin and sodium alginate.

2. The membrane of claim 1 wherein said high performance glassy polymer is selected from the group consisting of polysulfones, sulfonated polysulfones, polyethersulfones, sulfonated polyethersulfones, polyetherimides, cellulosic polymers, polyimides, polyamide/imides, polyether ether ketones, poly(benzobenzimidazole)s, polybenzoxazoles, polymers of intrinsic microporosity, and mixtures of thereof.

3. The membrane of claim 1 wherein said high performance glassy polymer is selected from the group consisting of cellulose acetate, cellulose triacetate, cellulose acetate-butyrate, cellulose propionate, ethyl cellulose, methyl cellulose, nitrocellulose, and mixtures of thereof.

4. The membrane of claim 1 wherein said fluoropolymer is an amorphous fluoropolymer.

5. The membrane of claim 1 wherein said fluoropolymer is selected from the group consisting of a homopolymer of 2,2-bistrifluoro-methyl-4,5-difluoro-1,3-dioxole (PDD), an amorphous copolymer of 2,2-bistrifluoro-methyl-4,5-difluoro-1,3-dioxole (PDD) with a complementary amount of another fluorine-containing monomer selected from the group consisting of tetrafluoroethylene (TFE), perfluoro (alkyl vinyl ether)s, hexafluoropropylene, vinylidene fluoride, and chlorotrifluoroethylene, an amorphous copolymer of 2,2-bistrifluoro-methyl-4,5-difluoro-1,3-dioxole (PDD) and tetrafluoroethylene (TFE), an amorphous copolymer of 2,2-bistrifluoro-methyl-4,5-difluoro-1,3-dioxole (PDD) and tetrafluoroethylene (TFE) with 65 mol-% of dioxole and an amorphous copolymer of 2,2-bistrifluoro-methyl-4,5-difluoro-1,3-dioxole (PDD) and tetrafluoroethylene (TFE), a copolymer of 2,2,4-trifluoro-5-trifluoromethoxy-1,3-dioxole (TTD) and tetrafluoroethylene (TFE) and a copolymer of 2,2,4-trifluoro-5-trifluoromethoxy-1,3-dioxole (TTD) and tetrafluoroethylene (TFE) with 80 mol-% of TTD and 20 mol-% of TFE, a fluoro-silane fluorinated copolymer with silane functional groups and a fluoro-epoxide fluorinated oligomer with epoxide functional groups.

6. A method of preparing a membrane comprising making a relatively porous and substantial void-containing selective asymmetric membrane support comprising a high performance glassy polymer, applying a hydrogel coating to the top surface of said membrane support and then applying a fluoropolymer coating on said hydrogel coating.

7. The method of claim 6 wherein said high performance glassy polymer is selected from the group consisting of polysulfones, sulfonated polysulfones, polyethersulfones, sulfonated polyethersulfones, polyetherimides, cellulosic polymers, polyimides, polyamide/imides, polyether ether ketones, poly(benzobenzimidazole)s, polybenzoxazoles, polymers of intrinsic microporosity, and mixtures of thereof.

8. The method of claim 6 wherein said high performance glassy polymer is selected from the group consisting of cellulose acetate, cellulose triacetate, cellulose acetate-butyrate, cellulose propionate, ethyl cellulose, methyl cellulose, nitrocellulose, and mixtures of thereof.

9. The method of claim 6 wherein said hydrogel is selected from the group consisting of gelatin and sodium alginate.

10. The method of claim 6 wherein said fluoropolymer is selected from the group consisting of a homopolymer of 2,2-bistrifluoro-methyl-4,5-difluoro-1,3-dioxole (PDD), an amorphous copolymer of 2,2-bistrifluoro-methyl-4,5-difluoro-1,3-dioxole (PDD) with a complementary amount of another fluorine-containing monomer selected from the group consisting of tetrafluoroethylene (TFE), perfluoro (alkyl vinyl ether)s, hexafluoropropylene, vinylidene fluoride, and chlorotrifluoroethylene, an amorphous copolymer of 2,2-bistrifluoro-methyl-4,5-difluoro-1,3-dioxole (PDD) and tetrafluoroethylene (TFE), an amorphous copolymer of 2,2-bistrifluoro-methyl-4,5-difluoro-1,3-dioxole (PDD) and tetrafluoroethylene (TFE) with 65 mol-% of dioxole and an amorphous copolymer of 2,2-bistrifluoro-methyl-4,5-difluoro-1,3-dioxole (PDD) and tetrafluoroethylene (TFE), a copolymer of 2,2,4-trifluoro-5-trifluoromethoxy-1,3-dioxole (TTD) and tetrafluoroethylene (TFE) and a copolymer of 2,2,4-trifluoro-5-trifluoromethoxy-1,3-dioxole (TTD) and tetrafluoroethylene (TFE) with 80 mol-% of TTD and 20 mol-% of TFE, a fluoro-silane fluorinated copolymer with silane functional groups and a fluoro-epoxide fluorinated oligomer with epoxide functional groups.

11. A process for separating at least one gas from a mixture of gases using a membrane comprising a relatively porous and substantial void-containing selective asymmetric membrane support comprising a high performance glassy polymer and two coating layers, a first coating layer comprising a hydrogel on the top surface of said membrane support and a second coating layer comprising a fluoropolymer on top of said first coating layer, the process comprising: (a) providing a membrane comprising a relatively porous and substantial void-containing selective asymmetric membrane support comprising a high performance glassy polymer and two coating layers, a first coating layer comprising a hydrogel on the top surface of said membrane support and a second coating layer comprising a fluoropolymer on top of said first coating layer, wherein said membrane is permeable to the at least one gas; (b) contacting the mixture on one side of said membrane to cause the at least one gas to permeate said membranes; and (c) removing from the opposite side of said membrane a permeate gas composition comprising a portion of the at least one gas which permeated said membrane.

12. The process of claim 11 wherein said mixture of gases comprises a mixture of volatile organic compounds in an atmospheric gas.

13. The process of claim 11 wherein said mixture of gases comprises nitrogen or oxygen in air.

14. The process of claim 11 wherein said mixture of gases comprises $CO_2$ in natural gas.

15. The process of claim 11 wherein said mixture of gases comprises $H_2$ from a mixture of $N_2$, $CH_4$, and Ar.

16. The process of claim 11 wherein said mixture of gases is a mixture of olefins and paraffins or a mixture of iso/normal paraffins.

17. The process of claim 11 wherein said mixture of gases is a fuel gas comprising methane, ethane, propane, and C3+ heavier hydrocarbons.

18. The process of claim 11 wherein said mixture of gases is at least two gases selected from the group consisting of nitrogen and oxygen, carbon dioxide and methane, hydrogen and methane or carbon monoxide, helium and methane.

\* \* \* \* \*